United States Patent [19]
Bibollet

[11] Patent Number: 5,064,208
[45] Date of Patent: Nov. 12, 1991

[54] FRONT SUSPENSION AND STEERING ASSEMBLY FOR A SNOW-BIKE

[75] Inventor: Jean-Claude Bibollet, Thones, France

[73] Assignee: Bibollet S.A., Chablais, France

[21] Appl. No.: 352,918

[22] Filed: May 17, 1989

[30] Foreign Application Priority Data

May 17, 1988 [FR] France ............................... 88 07130

[51] Int. Cl.⁵ ............................................... B62B 17/00
[52] U.S. Cl. ..................................... 280/21.1; 180/190
[58] Field of Search ........................ 180/184, 190, 182; 280/21.1, 22.1

[56] References Cited

U.S. PATENT DOCUMENTS

| | | | |
|---|---|---|---|
| 3,645,347 | 2/1972 | Brant | 280/28 X |
| 3,785,448 | 1/1974 | Merenheimo et al. | 280/21.1 X |
| 3,931,862 | 1/1976 | Cote | 280/21.1 |
| 4,690,234 | 9/1987 | Takada | 180/190 X |
| 4,768,794 | 9/1988 | Bibollet | 180/190 X |

FOREIGN PATENT DOCUMENTS

| | | |
|---|---|---|
| 1988482 | 4/1968 | Fed. Rep. of Germany . |
| 2063544 | 7/1975 | Fed. Rep. of Germany . |
| 8133936 | 7/1982 | Fed. Rep. of Germany . |
| 2593461 | 7/1987 | France . |
| 2586226 | 5/1990 | France . |
| 505629 | 5/1971 | Switzerland . |

OTHER PUBLICATIONS

PCT, WO87/01085, Feb. 1987, Bibollet et al.

Primary Examiner—Andres Kashnikow
Assistant Examiner—Michael Mar
Attorney, Agent, or Firm—Sandler, Greenblum & Bernstein

[57] ABSTRACT

An improved suspension arrangement for the front steering assembly of a snow-bike, and the snow-bike incorporating the improved suspension arrangement. The steering assembly for which the suspension is intended includes a steering column having a steering device such as a handlebar at its upper end and a ski at its lower end. The suspension arrangement includes an intermediate arm journalled with respect to the steering column and extending longitudinally of the snow-bike. A rear portion of the intermediate arm is journalled with respect to the ski. A suspension assembly, such as a piston-cylinder and spring assembly, is connected between the intermediate arm and the steering column.

22 Claims, 3 Drawing Sheets

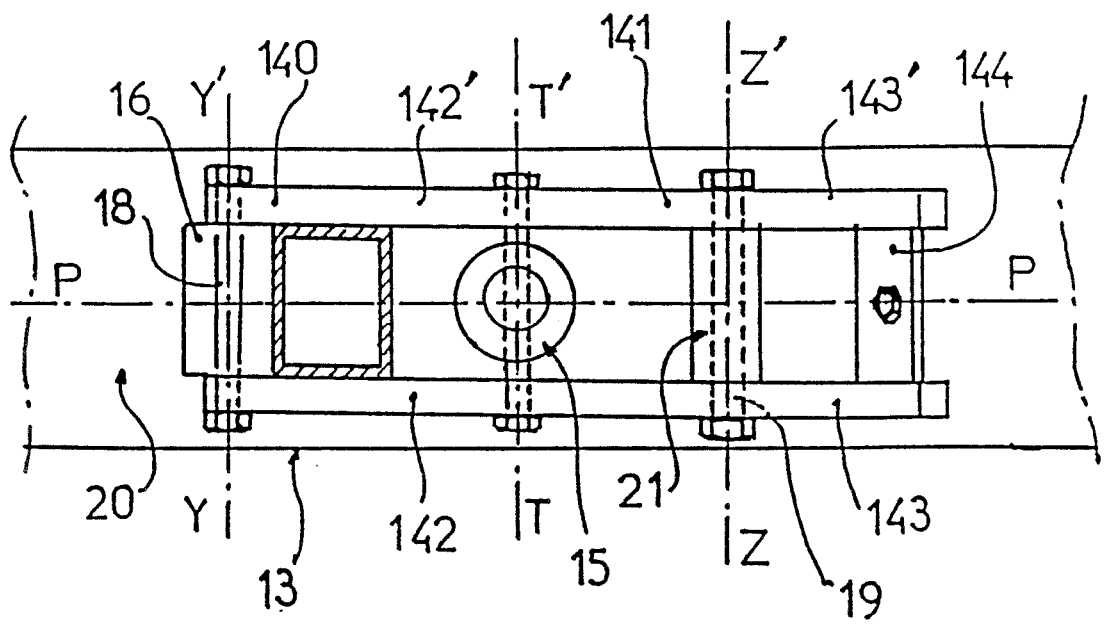
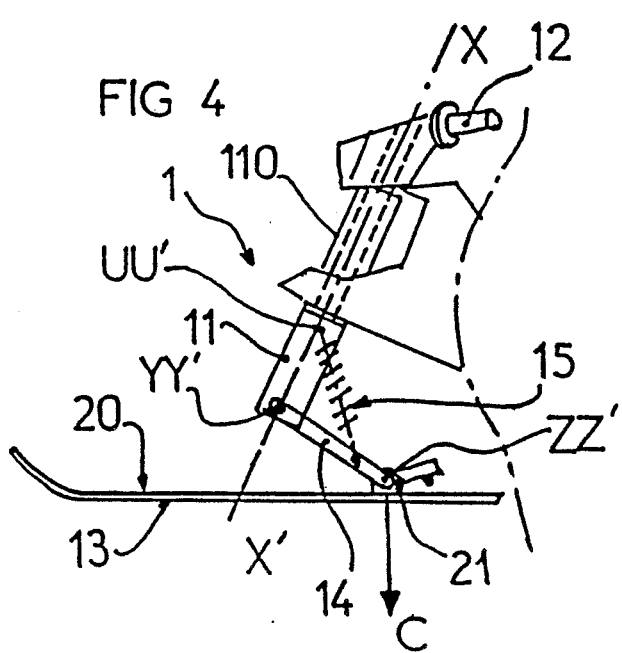

FRONT SUSPENSION AND STEERING ASSEMBLY FOR A SNOW-BIKE

FIELD OF THE INVENTION

The present invention relates to a vehicle of the snow-cycle or snow-bike type. More particularly, it concerns an improvement to the suspension device for the front steering assembly.

2. Discussion of Background and Relevant Information

The type of vehicle cited above is adapted to travel on snow and comprises a rear support assembly and a front steering assembly. The rear support assembly generally includes the motor which activates the track of propulsion, such as a cleated endless belt, whereas the front steering assembly is pivotally mounted on the front of the support assembly.

Various patents and patent applications have already described such devices, for example U.S. Pat. Nos. 3,785,448 and 3,645,347, Swiss patent No. 505,629, French Patent No. 2,586,226, as well as French Patent No. 2,593,461.

In all of these documents, a suspension system for the front steering assembly is shown or described of which some characteristics will be referred to below. In U.S. Pat. No. 3,785,448, as well as in French Patent No. 2,593,461, the suspension is embodied by a single spring encircling the steering column, whereas in U.S. Pat. No. 3,645,347 and French Patent No. 2,586,226, the ski is connected to the steering column by means of a flexion blade. Swiss Patent No. 505,629 discloses a ski journalled on the lower end of the steering column, whereas a shock absorber connects the front of the ski to the column.

Despite efforts developed by the manufacturers, snow-bikes of the prior art mentioned above, as well as those now marketed, are not satisfactory, because the absorption of surface irregularities and different obstacles which are encountered do not occur with sufficient comfort and/or safety. Consequently, the driving of the snow-bike is made difficult, particularly on curved passageways.

SUMMARY OF THE INVENTION

According to the invention, a vehicle comprises a front steering assembly journalled on a rear support assembly around an axis. The steering assembly comprises a steering column having a handlebar connected to an upper end and a ski connected to its lower end. The ski is connected to the steering column by an intermediate journalled arm, the intermediate arm extending towards the bottom and towards the rear of the vehicle. The intermediate arm has a front end which is journalled around a transverse axis with respect to the steering column which is journalled around a transverse axis on the intermediate arm which also has a ski. A suspension assembly connects the intermediate journalled arm to the steering column.

Accordingly to a further aspect of the invention, a retention arm extends forwardly and downwardly from a lower end of the steering column and the front end of the intermediate arm is journalled around a transverse axis on the retention arm. The lower end of the steering column comprises a tube open toward the bottom end in which a suspension system is located. The intermediate journalled arm comprises two laterally spaced rods and the transverse axis of the intermediate arm is journalled directly on the lower end of said steering column.

The journal axis of the steering column passes through a point of the ski situated at a substantially equal distance from the front end and rear end of the ski. The journal axis of the intermediate arm on the ski is positioned transversely on the rear half of said ski.

According to another aspect of the invention, a stop system to limit upward pivoting of the rear part of the ski is provided. The stop system limits the upward pivoting of the rear of the ski with respect to the intermediate arm, the stop being elastic. The suspension system has a maximum extended position and when the ski projects in a position substantially perpendicular to the pivoting axis XX' of the steering column, the suspension system is in the maximum extended position. The intermediate arm comprises two laterally spaced rods which extend toward the rear by two extensions forming an obtuse angle and connected by a cross piece comprising an elastic stop projecting towards the bottom for limiting pivoting movement of the ski.

According to the invention, a front suspension and steering assembly for a snow-bike includes a steering column having an upper end and a lower end and a longitudinal axis extending between the ends. A steering device is attached to the upper end of the steering column and an intermediate arm journalled transversely with respect to the longitudinal axis of the steering column. A suspension assembly for cushioning shocks transmitted to said snow-bike and extends between the steering column and the intermediate arm and a ski is journalled transversely to the intermediate arm.

The front suspension and steering assembly further comprises a retention arm extending forwardly with respect to the snow-bike, wherein the intermediate arm is transversely journalled at a forward portion thereof to the retention arm. The intermediate arm is further transversely journalled along the longitudinal axis of the steering column rearwardly of the forward portion. The intermediate arm is transversely journalled at a forward portion thereof along the longitudinal axis of the steering assembly and the suspension assembly extends from the steering column to a portion of the intermediate arm rearwardly of the forward portion. The intermediate arm further comprises a rear portion extending rearwardly and upwardly from the ski. The rear portion of the intermediate arm has an elastic abutment affixed thereto to limit pivoting of the ski relative to the longitudinal axis of the steering column. The rear portion of the intermediate arm and the abutment are configured and arranged such that the ski is substantially perpendicular to the longitudinal axis of the steering column in a limited position at which the abutment engages an upper surface of the ski.

According to another aspect of the invention, the longitudinal axis of the steering column extends through a point of the ski positioned substantially equally between the front end and the rear end of the ski.

Furthermore, a rear support assembly is journalled relative to the longitudinal axis of the steering column to constitute a snow-bike.

Other characteristics, and advantages of the invention will become apparent from the description which follows with respect to the annexed drawings, which are given by way of non-limiting examples.

BRIEF DESCRIPTION OF THE DRAWINGS

FIGS. 1-3 show a first embodiment of the device according to the invention.

FIG. 1 is a lateral view of the snow-bike in its position of usage;

FIG. 2 is an enlarged view of the suspension system;

FIG. 3 is a cross-sectional view along III—III of FIG. 2;

FIG. 4 is a partial view similar to FIG. 1 showing an alternative embodiment;

DETAILED DESCRIPTION OF PREFERRED EMBODIMENT

Figure 1:
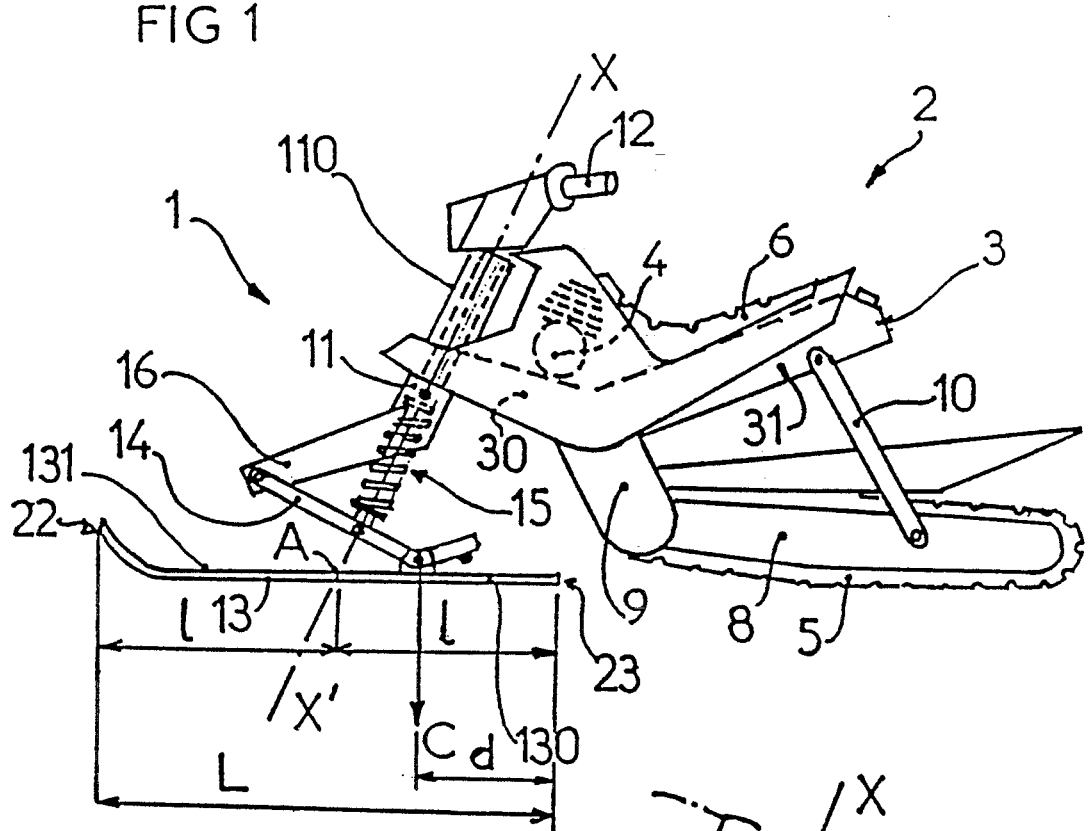

The present invention seeks to overcome the above-mentioned disadvantages and proposes a snow-bike whose capacities of absorption of irregularities in terrain are particularly improved, thus making it possible to pass over obstacles with total safety and with improved comfort.

To this end, the snow-bike according to the invention is constituted by a front steering assembly journalled on a rear support assembly, the front steering assembly being constituted by a steering column supporting a handlebar on its upper end, and a ski on its lower end, wherein the front ski is connected to the steering column by a journalled intermediate arm, while a suspension assembly connects the intermediate journalled arm to the steering column.

According to an additional characteristic, the intermediate journalled arm extends downwardly and towards the rear, its front end being journalled on the steering column or a part solidary with the latter, while its rear end is journalled on the ski.

According to another characteristic, the front end of the intermediate arm is journalled around a transverse axis on a retention arm solidary with the lower end of the steering column, and extending downwardly and towards the front.

According to another characteristic, the journal axis of the steering column passes through a point of the front ski, situated at an equal distance from its front end and its rear end, which facilitates the pivoting of the steering column, and thus facilitates maneuvering of the curved passages with the snow-bike. With such an arrangement combined with an intermediate journalled arm extending towards the rear, the front ski is weighted in its rear part, which facilitates the lift of its front part, and thus facilitates the absorption of obstacles.

The snow-bike according to the invention is constituted by a front steering assembly 1 journalled in a fashion known in and of itself around an axis XX' along steering column 11 on a rear support assembly 2. The pivoting axis XX' is in the longitudinal and vertical plane of symmetry of the device, and extends downwardly and frontwardly to be inclined in the plane, so as to form an angle a with the ground. According to a preferred embodiment, the axis XX' of the steering column 11 passes through a point A of the front ski 13, point A being at a substantially equal distance 1 from its front end 22 and from its rear end 23. Length 1 being equal to the total length of ski L divided by two. The rear support assembly 2 is constituted by a chassis 3 extending towards the rear, constituted by a front part 30 extending towards the rear and bottom, and a rear part 31 extending upwardly and towards the rear. The front part 30 is in the general shape of an inverted U and serves as the support for the motor 4. The rear part 31 is in the shape of a closed case and constitutes the fuel tank and also supports the driver via seat 6.

The snow-bike is propelled by a track 5 activated by the motor 4 in a fashion known in and of itself, and supported by a track support 8 retained on the chassis by two journalled arms, a front arm 9 journalled in the front zone of the rear part 31 of the chassis, and a rear arm 10 journalled at its rear end.

Figure 2:
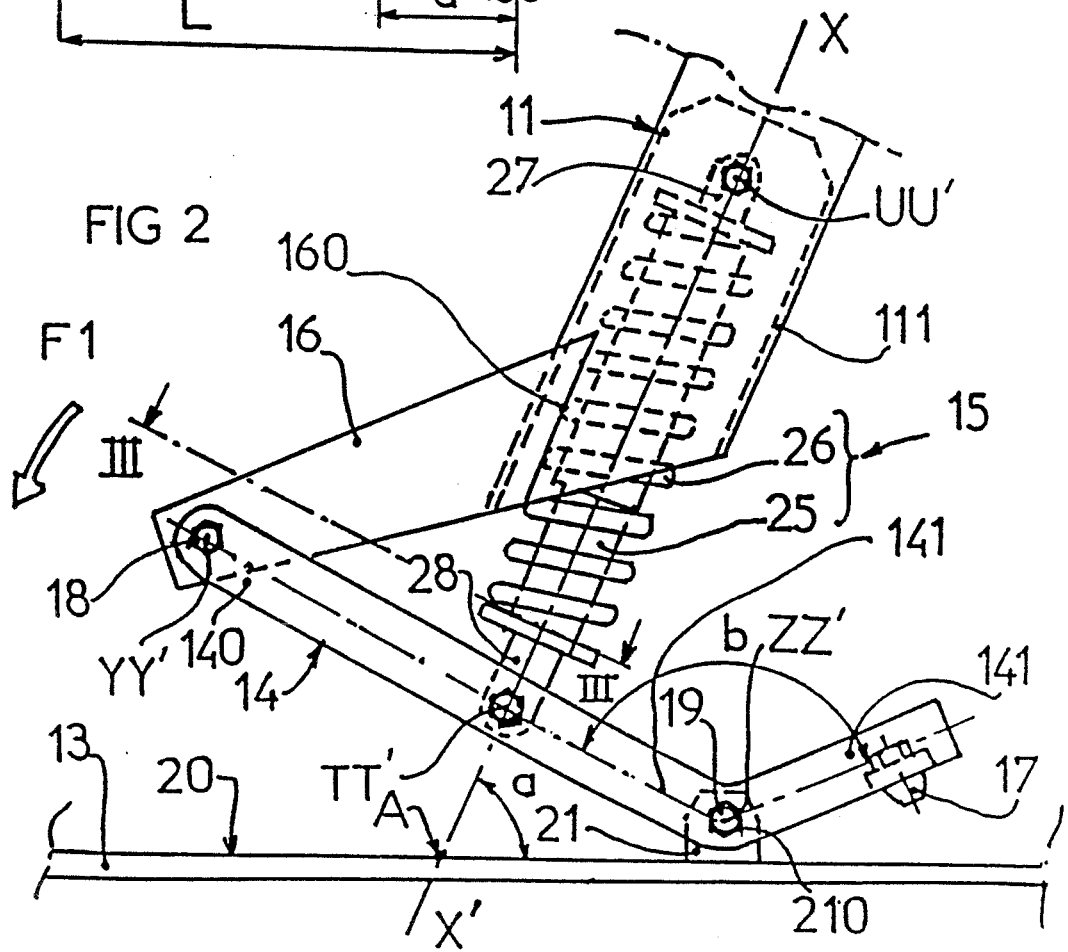

The front steering assembly 1 is constituted by a steering column 11 supporting a handlebar 12, or equivalent steering device, at its upper end a handlebar and supporting a ski or runner 13 at its lower end. As can be seen in FIG. 1, the steering column 11 is journalled on the front end of the chassis around axis XX' which is embodied by a sleeve 110. A tube 111 open towards the bottom constitutes the lower part of the steering column 11 as shown in FIG. 2.

According to the invention, the retention of the front ski 13 to the steering column 11 is ensured by a journalled intermediate arm 14 and a suspension system or combination 15. The intermediate arm 14 extends towards the rear and bottom, and is journalled around a transverse axis YY' by its front end 140, on a retention arm 16. Its rear end 141 is journalled on the ski 13 around a transverse axis ZZ'. According to a preferred arrangement, the retention arm 16 extends towards the front and bottom, and is, for example, embodied by a profile in the form of a welded box girder 160 at the lower end of the steering column 11.

The intermediate journalled arm 14 is, for example, as shown in FIG. 3, constituted by two parallel laterally spaced small rods 142, 142', whose front ends 140 are journalled around axis YY' on the retention arm 16, while their rear ends 141 are journalled on the ski around axis ZZ'.

A stop system limits the pivoting towards the top of the rear part 130 of the ski 13. To this end, the small rods 142, 142' are extended towards the rear, by extensions 143, 143' connected by a cross piece 144, and form an obtuse angle b with them, as shown in FIG. 2. The cross piece includes a stop 17 directed towards the bottom, preferably elastic, and is made of rubber, for example.

It is to be noted also that the journal axes YY' and ZZ' are embodied, respectively, by transverse bolts 18 and 19. Transverse bolt 19 retains the rear end 141 and is maintained on the upper surface 20 by a support 21 rigidly affixed with the rear half 130 of the ski 13. Bolt 19 is situated at a distance d from heel 23, such that d is less than 1. The length 1 being equal to the total length of ski L divided by two. Support 21 is constituted by a transverse projection of the ski, or by an element made rigid with the latter, and having a transverse hole 210 to receive the bolt 19. The position of the axis ZZ' makes it possible to weight C the ski 13 in its rear part 130, and thus to permit the lifting of its front part 131.

The suspension is constituted by a suspension assembly 15, including a shock absorber 25 and a spring 26.

According to a preferred arrangement, the suspension assembly 15 is positioned, at least in part in the steering column, which has an interior diameter sufficient enough to permit clearance around the axis UU' during the operation. To do this, the lower end of the steering column ends in a tube 111 which is open towards the bottom. The upper end 27 of the suspension assembly is mounted and journalled in the steering column around the transverse axis UU', while lower end 28 is journalled on the intermediate arm 14 around an axis TT' connecting the two small rods 142, 142' by their median portions.

FIG. 4 shows an alternative embodiment according to which the journalled intermediate arm is directly journalled on the lower end of the steering column 11, the suspension system 15 connecting the journalled arm 14 to the steering column 11.

Figure 5:
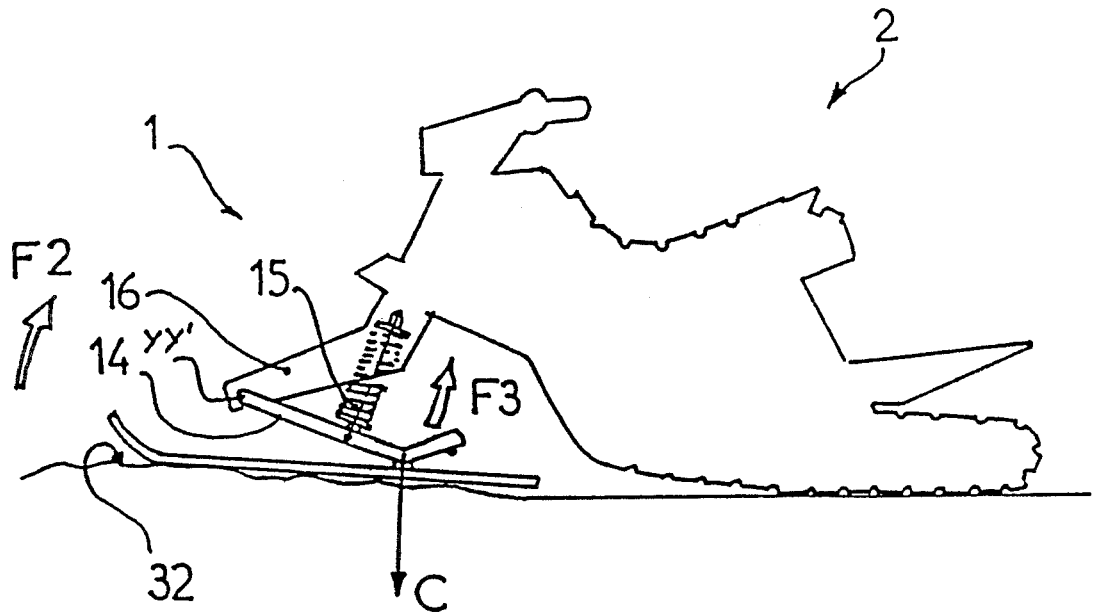
FIG. 5 is a schematic view similar to FIG. 1 showing the snow-bike during passage over an obstacle.

FIG. 5 shows how the suspension system acts according the invention, during the passage of the snow-bike over an obstacle 32. It can be seen that the ski absorbs the obstacle by the pivoting of the intermediate arm 14 in the direction of arrow F3, around the axis YY', which compresses the suspension assembly 15.

Figure 6:
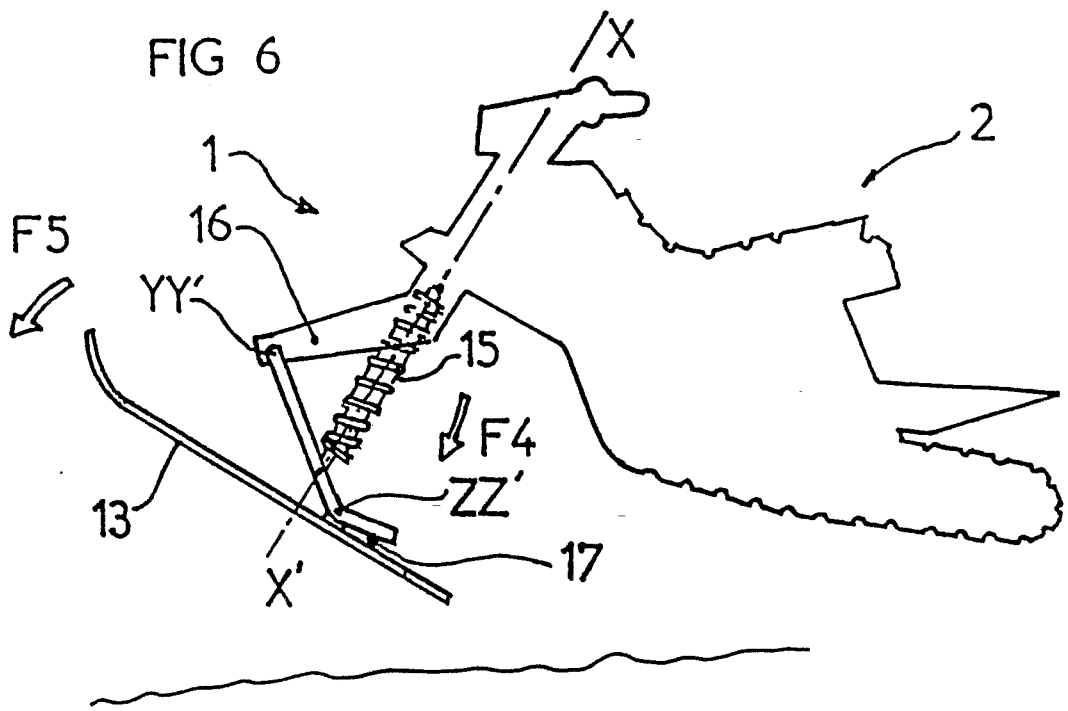
FIG. 6 is a schematic view similar to FIG. 1 showing the snow-bike during a jump.

In FIG. 6 the snow-bike is shown during a jump. It can be noted that the intermediate arm 14 is biased by the suspension system 15 by pivoting around axis YY' in the direction of arrow F4, and that the weight of the front part of the ski causes its pivoting in the direction of arrow F5 around the axis ZZ', until stop 17 limits this pivoting, and places the ski in a position substantially perpendicular to axis XX' of the steering column, as is shown in the figure. This stop arrangement is particularly appreciable when it is combined with the system proposed in the French Patent Application filed by the Applicant under No. 86.08001 which corresponds to U.S. Pat. No. 4,768,794.

When the rear end portion of the ski makes contact with the ground after a jump, there is first a compression of the stop 17, and secondly an action of the suspension assembly 15. The angle b is thus such that in the extreme position of FIG. 6, the ski projecting from the stop system 17 is in a position substantially perpendicular to the steering column 11.

One would not go beyond the scope of the invention if the suspension system were to be comprised of only one spring 26, while the shock absorber 25 would be eliminated.

Of course the invention is not limited to the embodiments described and shown by way of examples, but includes all equivalent techniques as well as their combinations.

I claim:

1. A vehicle comprising a front steering assembly journalled on a rear support assembly around an axis, said steering assembly comprising a steering column having a handlebar connected to an upper end and a ski connected to a lower end, said ski being connected to said steering column by an intermediate journalled arm, said intermediate arm extending towards the bottom and towards the rear of said vehicle, said intermediate arm having a front end which is journalled around a transverse axis with respect to said steering column, said intermediate arm also having a rear end which is journalled around a transverse axis on said ski, and a suspension assembly connecting said intermediate journalled arm to said steering column at a point on the intermediate arm spaced from said front end and from said rear end of said intermediate arm.

2. The vehicle of claim 1 wherein said rigid member is a retention arm extending forwardly and downwardly from a lower end of said steering column, wherein said front end of said intermediate arm is journalled around a transverse axis on said retention arm.

3. The vehicle of claim 2 wherein said lower end of said steering column comprises a tube open toward the bottom end in which a suspension system is located.

4. The vehicle of claim 3 wherein said intermediate journalled arm comprises two laterally spaced rods.

5. The vehicle of claim 4 wherein said transverse axis of said intermediate arm is journalled directly on said lower end of said steering column.

6. The vehicle of claim 1 wherein said journal axis of said steering column passes through a point of said ski situated at a substantially equal distance from the front end and rear end of said ski.

7. The vehicle of claim 6 wherein said journal axis of said intermediate arm on said ski is positioned transversely on the rear half of said ski.

8. The vehicle of claim 1 further comprising a stop system to limit upward pivoting of said rear part of said ski.

9. The vehicle of claim 8 wherein said stop system limits the upward pivoting of said rear of said ski with respect to said intermediate arm, said stop being elastic.

10. The vehicle of claim 9 wherein said suspension system has a maximum extended position and wherein when said ski projects in a position substantially perpendicular to said pivoting axis XX' of said steering column, said suspension system is in said maximum extended position.

11. A vehicle comprising a front steering assembly journalled on a rear support assembly around an axis, said steering assembly comprising a steering column having a handlebar connected to an upper end and a ski connected to a lower end, said ski being connected to said steering column by an intermediate journalled arm, said intermediate arm extending towards the bottom and towards the rear said vehicle, said intermediate arm having a front end which is journalled around a transverse axis with respect to said steering column, said intermediate arm also having a rear end which is journalled around a transverse axis on said ski, and a suspension assembly connecting said intermediate journalled arm to said steering column, wherein said intermediate arm comprises two laterally spaced rods which extend toward the rear by two extensions forming an obtuse angle and connected by a cross piece comprising an elastic stop projecting towards the bottom for limiting pivoting movement of said ski.

12. A front suspension and steering assembly for a snow-bike comprising:
(a) a steering column having an upper end and a lower end and a longitudinal axis extending between said ends;
(b) a steering device attached to said upper end of said steering column;
(c) an intermediate arm journalled for movement about a transverse axis with respect to said longitudinal axis of said steering column, said intermediate arm having a forward end and a rearward portion;
(d) a suspension assembly for cushioning shocks transmitted to said snow-bike, said suspension assembly extending between said steering column and said intermediate arm and connecting said intermediate arm to said steering column at a point on said intermediate arm spaced from said forward end and said rearward end of said intermediate arm; and
(e) a ski, said ski being journalled to said rearward portion of said intermediate arm for pivotal movement about a transverse axis with respect to said intermediate arm.

13. The front suspension and steering assembly of claim 12 further comprising a retention arm extending forwardly with respect to said snow-bike, wherein said intermediate arm is transversely journalled at a forward portion thereof to said retention arm, said intermediate arm further being transversely journalled along said longitudinal axis of said steering column rearwardly of said forward portion.

14. The front suspension and steering assembly of claim 12 wherein said intermediate arm is transversely journalled at a forward portion thereof along said longitudinal axis of said steering assembly and wherein said suspension assembly extends from said steering column to a portion of said intermediate arm rearwardly of said forward portion.

15. The front suspension and steering assembly of claim 12 wherein said longitudinal axis of said steering column extends through a point of said ski positioned substantially equally between the front end and the rear end of said ski.

16. The front suspension and steering assembly of claim 12 in combination with a rear support assembly journalled relative to said longitudinal axis of said steering column to constitute a snow-bike.

17. The front suspension and steering assembly of claim 12 wherein said intermediate arm is journalled to said ski on the rear half of said ski.

18. A front suspension and steering assembly for a snow-bike comprising:
    (a) a steering column having an upper end and a lower end and a longitudinal axis extending between said ends,
    (b) a steering device attached to said upper end of said steering column;
    (c) an intermediate arm journalled for movement about a transverse axis with respect to said longitudinal axis of said steering arm;
    (d) a suspension assembly for cushioning shocks transmitted to said snow-bike, said suspension assembly extending between said steering column and said intermediate arm; and
    (e) a ski journalled for movement about a transverse axis to said intermediate arm;
    wherein said intermediate arm further comprises a rear portion extending rearwardly and upwardly from said ski, wherein said rear portion of said intermediate arm has an elastic abutment affixed thereto to limit pivoting of said ski relative to said longitudinal axis of said steering column.

19. The front suspension and steering assembly of claim 18 wherein said rear portion of said intermediate arm and said abutment are configured and arranged such that said ski is substantially perpendicular to said longitudinal axis of said steering column in a limit position at which said abutment engages an upper surface of said ski.

20. A front suspension and steering assembly for a snow-bike comprising:
    (a) a steering column having an upper end and a lower end and a longitudinal steering axis extending between said ends;
    (b) a steering device attached to said upper end of said steering column;
    (c) a ski having a front end;
    (d) means connecting said ski to said steering column for enabling said ski to be steered about said longitudinal steering axis by means of said steering device and for facilitating said front end of said ski to pivot downwardly, said connecting means comprising an intermediate arm having a first portion pivotally connected with respect to said steering column and a second portion pivotally connected to said ski at a location of said ski rearward of a median portion of said ski to define a forward portion of said ski and a rearward portion of said ski, wherein said forward portion of said ski is heavier than said rearward portion of said ski;
    (e) a retention arm extending from said steering column and pivotally connected to said first portion of said intermediate arm;
    (f) means for stopping downward pivoting of said ski; and
    (g) a suspension assembly for cushioning shocks transmitted to said snow-bike, said suspension assembly connected to said intermediate arm forward of said location of said ski to which said intermediate arm is connected and rearward of said first portion of said intermediate arm to which said retention arm is connected.

21. The front suspension and steering assembly of claim 20, said ski having a lower sliding surface and wherein said means for stopping downward pivoting of said ski comprises means for stopping downward pivoting of said ski at a point at which said lower sliding surface of said ski is generally perpendicular to said longitudinal steering axis.

22. A front suspension and steering assembly for a snow-bike comprising:
    (a) a steering column having an upper end and a lower end and a longitudinal steering axis extending between said ends;
    (b) a steering device attached to said upper end of said steering column;
    (c) a ski having a front end;
    (d) means connecting said ski to said steering column for enabling said ski to be steered about said longitudinal steering axis by means of said steering device and for facilitating said front end of said ski to pivot downwardly, said means for connecting comprising an intermediate arm journalled with respect to said steering column along a first transverse axis and journalled with respect to said ski along a second transverse axis;
    (e) means for stopping downward pivoting of said ski; and
    (f) a suspension assembly extending along said steering axis and journalled along a third transverse axis with respect to said intermediate arm, wherein both of said first transverse axis and said third transverse axis are forward of said second transverse axis.

* * * * *